(12) United States Patent
Vainshtein

(10) Patent No.: US 8,372,506 B2
(45) Date of Patent: Feb. 12, 2013

(54) PROTECTIVE MAT

(76) Inventor: Leonid Vainshtein, Phoenix, AZ (US)

( * ) Notice: Subject to any disclaimer, the term of this patent is extended or adjusted under 35 U.S.C. 154(b) by 0 days.

(21) Appl. No.: 13/524,540

(22) Filed: Jun. 15, 2012

(65) Prior Publication Data

US 2012/0247574 A1    Oct. 4, 2012

Related U.S. Application Data

(63) Continuation-in-part of application No. 12/658,171, filed on Feb. 3, 2010, now abandoned.

(60) Provisional application No. 61/178,510, filed on May 15, 2009.

(51) Int. Cl.
  *B32B 3/28* (2006.01)
  *B32B 3/30* (2006.01)
  *D06F 39/08* (2006.01)
  *F16K 23/00* (2006.01)
  *B67D 1/16* (2006.01)
(52) U.S. Cl. ......... 428/167; 428/188; 137/312; 222/108
(58) Field of Classification Search .................. 428/167, 428/188; 15/238; 73/40; 222/108; 108/24; 296/38; 4/251.1; 220/571; 137/312, 313, 137/314
See application file for complete search history.

(56) References Cited

U.S. PATENT DOCUMENTS

| | | | |
|---|---|---|---|
| 4,023,380 A | 5/1977 | Drouin | |
| 5,199,457 A * | 4/1993 | Miller | ........................ 137/312 |
| 5,339,676 A | 8/1994 | Johnson | |
| 5,966,958 A | 10/1999 | Maynard | |
| 6,412,638 B1 | 7/2002 | Carter | |
| 2007/0169256 A1 | 7/2007 | Arraz | |
| 2007/0272302 A1 | 11/2007 | Carter | |

* cited by examiner

*Primary Examiner* — Catherine A Simone
(74) *Attorney, Agent, or Firm* — Paul B. Heynssens

(57) ABSTRACT

A mat for collecting water from under cabinet leaks. The mat is an elastomeric material sized to fit within the cabinet space and has ribs defining inclined channels which direct water to a forward collection area which is viewable when the cabinet is opened. The ribs and webs on the underside of the mat provide support for items that may be placed on the mat. In an alternate embodiment, a wireless alarm signal is provided to a wireless device user. The alarm having conductivity probes which are insertable in a reservoir in the fluid collection area to emit an alarm when a leak occurs.

14 Claims, 9 Drawing Sheets

PROTECTIVE MAT

CROSS-REFERENCE TO RELATED APPLICATION(S)

This is a continuation-in-part of application Ser. No. 12/658,171, filed Feb. 3, 2010, which is based on U.S. Provisional Patent Application Ser. No. 61/178,510, filed May 15, 2009 the subject matter of which is incorporated herein by reference.

TECHNICAL FIELD

The present invention relates to a protective mat for kitchen and bathroom cabinets, vanities and similar installations where fluid leakage may occur which, if undetected, may result in damage to cabinets, floors, walls and adjacent areas.

BACKGROUND

Water leakage is a problem particularly in less visible areas such as under kitchen and bathroom cabinets and vanities where there are plumbing or other connections. In these areas, a small or minute leak can occur, which over a period of time, can cause considerable damage resulting in mildew, rot and damage to wooden cabinets, as well as adjacent walls and floors.

It is not uncommon for under sink water treatment appliances, such as reverse osmosis units, to experience a small leak such as a pin hole leak in a line which over a period of time will cause the types of damages mentioned above. Because these types of leaks are partially concealed from view, the leaks are not always detected until after extensive damage has occurred.

Another problem with leakage in less accessible areas is that these areas are often used for storage of household items as well as for installation of plumbing units such as reverse osmosis units. Reverse osmosis tanks are generally heavy and obscure visibility to the cabinet area. Stored items become water logged adding to the problem.

Conventional water proof protective pans available offer only limited protection against water damage as a physical barrier. A conventional pan generally will not prevent water from overflowing the pan and conventional pans generally are relatively flimsy in nature and do not provide the user with a leakage alarm.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present invention relates to a protective water leak collection mat that users may place beneath cabinets such as kitchen cabinets, bathroom cabinets and vanities to protect the floor of the cabinet and adjacent areas from damage from plumbing leaks. The mat is constructed to collect liquids against a dam disposed at the bottom of a downward sloping collection surface. Channels along the bottom of the dam are sloped so that the fluid collected against the dam flows into a collection area where the alarm is disposed. The mat also advantageously includes an alarm system that is capable of providing a wireless signal that may be received upon a wireless device. The present invention will also help to protect the floor of the cabinets from substance spills from items stored in such cabinets such as dish soaps, cleansers and other products.

The present invention provides a protective water leak collection mat which is configured to conform to the interior dimensions of a cabinet. Most under sink cabinets, such as those beneath kitchen sinks, are of a standard size measuring approximately 24" deep by 34" wide. The protective mat is fabricated from a suitable rubber or elastomeric material which provides some flexibility but which also provides the necessary rigidity to support items placed on the mat.

The mat is preferably a rectangular molded product. The bottom or undersurface of the mat has a plurality of downwardly extending webs forming a grid pattern to support the mat as well as any water collected and items that may be placed on the upper surface of the mat. The outer periphery of the mat has side edges that retain leaks, preventing them from spilling out over the mat onto the adjacent floor surface. Ribs on the top of the mat form downward sloping (back to front in orientation) channels to direct a liquid to the front of a mat where it encounters a dam that is generally perpendicular to the ribs. The dam is constructed with a slope at its bottom so that liquid collecting against the dam tends to flow from the exterior sides into a reservoir, centrally located on the mat. In general there is a compound slope to the mat, namely from back to front, and from the sides to a central location. The purpose of the compound slope is to direct liquids to a collection point so that the sufficient liquid is present to activate an alarm that may be any type of alerting alarm, including an audible alarm and also including a wireless connection to cause an alert to be displayed on a cell phone, or other wireless enabled device through Bluetooth, WI-FI or other wireless technologies to connect to a multitude of devices such as home networks, central home alarm systems, home computers, cell phones and the like. The compound slope has the effect of increasing the sensitivity of the alarm by collecting liquid from multiple directions to one central spot.

The upper surface of the protective mat has a plurality of parallel ribs extending from the rear edge of the mat to a location spaced from the front or forward edge of the mat forming a plurality of channels between the ribs. The ribs and channels form a water channeling area. These ribs are of a height that increases from rear to front so that the plane defined by the upper edge of the ribs is generally horizontal when the mat is placed in a horizontal position to provide a level and robust support surface for items placed on the mat such as household cleansers and soaps, as well as heavy items such as a reverse osmosis tank which is often installed beneath a sink. Any water which leaks on the rear surface of the mat will be directed by the channels between the ribs to the forward collection area of the mat. A user can periodically open the cabinet and quickly visually check and if water has collected in this area. The user will be alerted to the presence of a leak even an obscure leak toward the rear of the cabinet.

An optional feature of the mat includes an alarm. The alarm has a housing which contains a battery, conductivity circuitry, audible alarm and a transmitter that may transmit a signal to alert the user at a remote location that water has collected on the mat so the user can remove the mat and empty the water that has leaked onto the mat and take appropriate remedial action. The remote location may be a wireless device such as a cellular phone or the like transmitting through Bluetooth, WI-FI or other wireless technologies to connect to a multitude of devices such as home networks, central home alarm systems, home computers, cell phones and the like.

The water collection area of the mat has a small reservoir at a central location. A dam extending transversely along the front edge of the channels will direct the water to the collection reservoir which, when filled, will overflow into the collection area. The alarm device has a pair of contacts which, when the device is properly positioned, extend into the reservoir. Conductivity is established when water is present in the reservoir which completes the circuit and will initiate an alarm.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

The above and other advantages and objects of the present invention will become more apparent from the following description, claims and drawings in which:

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
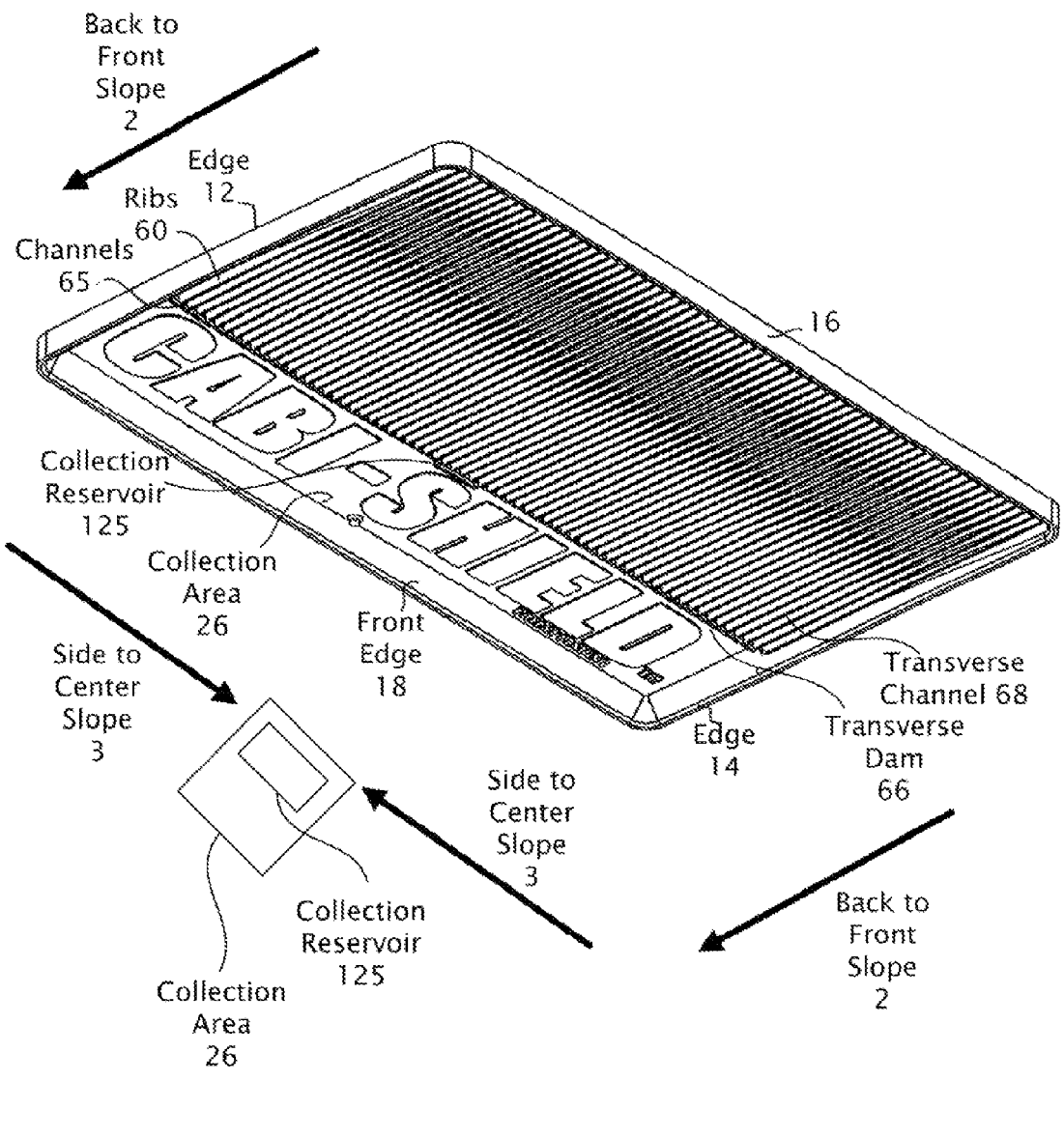
FIG. 1 is a top perspective view of a mat.

FIG. 1 is a top perspective view of a mat 100 according to the present invention. The outer periphery of the mat has side edges 12, 14, 16, 18 that retain leaks, preventing them from spilling out over the mat 100 onto the adjacent floor or cabinet surface (not shown). In addition a lowest collection point is provided 125 to collect fluid initially so that an alarm (200 of FIG. 4) may be activated due to sufficient fluid pooled for conduction. Due to the construction very little fluid is needed to activate the alarm. If further fluid is spilled upon the mat beyond the capacity of a first depression, or collection point, it overflows into a larger collection area 26 to contain the spill. Ribs 60 on the top of the mat have, formed between them downward sloping (back to front in orientation 2) channels 65 to direct a liquid to the front of a mat 100. At the front of the mat 100 the fluid flow is blocked by a dam 66 that is generally perpendicular to the ribs 60. Between the dam and the ends of the ribs is constructed a channel 68 with a slope 3 at its bottom so that liquid collecting against the dam tends to flow from the exterior sides into a reservoir 125, centrally located on the mat. Typically there are two downwardly sloping channels 65, 68 against the dam 66 so that one or more collection areas 125, 26 may be disposed in a central area of the mat. In general there is a compound slope to the mat, namely from back to front 2, and from the sides to a central location 3. The purpose of the compound slope is to direct liquids to a collection point 125 so that the sufficient liquid is present to activate an alarm that may be any type of alerting alarm, including an audible alarm, and also may be a wireless connection to cause an alert to be displayed on a cell phone, or other wireless enabled device through Bluetooth, WI-FI or other wireless technologies to connect to a multitude of devices such as home networks, central home alarm systems, home computers, cell phones and the like. The compound slope has the effect of increasing the sensitivity of the alarm by collecting liquid from multiple directions to one central spot.

An example of the mat 100 of the present invention is shown as an integrally molded product fabricated from a suitable material such as natural or synthetic rubber or a selected plastic such as polyethylene. The mat 100 is generally rectangular having opposite side edges 12 and 14, rear edge 16 and front edge 18. In drawing FIGS. 1 and 4, the mat is shown embossed with the trademark CABI-SHIELD. Although the mat is shown as being generally rectangular, the mat can have other shapes for particular applications. In most applications, a rectangular configuration is preferred as it is compatible with the dimensions and shape of an under cabinet space such as cabinet space below a kitchen sink which generally is approximately 24" deep by 34" wide. However any shape suitable for an area to be protected may be provided.

Figure 2:
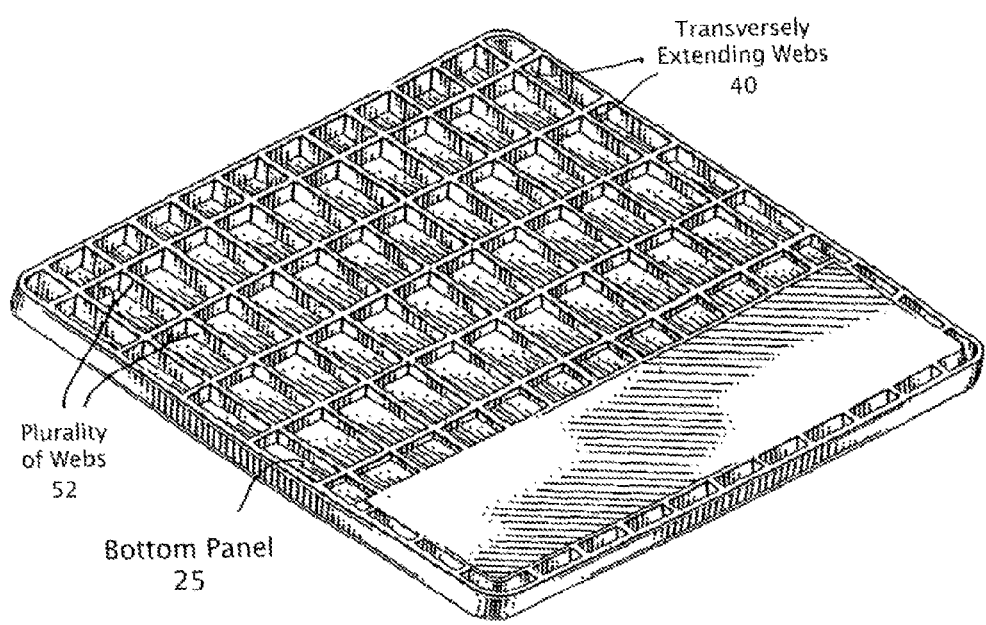
FIG. 2 is a bottom perspective view of a mat.

FIG. 2 is a bottom perspective view of a mat. The bottom panel 25 surface is provided with a plurality of integrally formed transversely extending webs 40. The webs 40 may decrease in height with the forward most web being the shallowest. Accordingly, the rear section of the bottom panel 25 is supported in an inclined position, forwardly and downwardly inclining from the rear wall to an intermediate location. A plurality of webs 52 extend between the transverse webs and together form a grid pattern supporting the mat and any contained water, as well as household items that may be placed on the upper surface of the mat. Alternatively the mat may be generally flat with channels of varying depth disposed in the mat so that front to back drainage is achieved.

Figure 3:
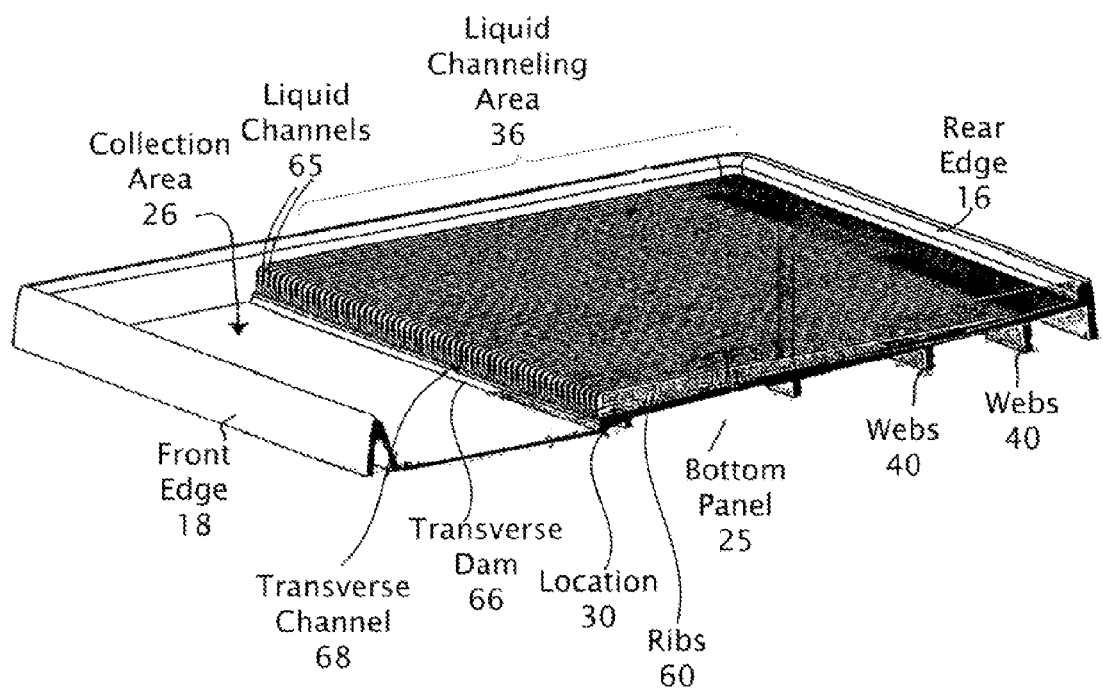
FIG. 3 is a cross-sectional view of the mat.

FIG. 3 is a cross-sectional view of the mat 100 of the present invention The bottom panel 25, extends forwardly from a location below the top of the rear edge 16 at a downward inclination of about 2 degrees to 6 degrees to an intermediate location 30 on the mat. From the location 30, the bottom panel is generally horizontal extending to the front edge 18 of the mat. The forward section of the bottom panel, the front edge 18 and a portion of the opposite edges 12 and 14 define a water collection area 26 located at the front of the mat.

The peripheral edges 16, 18 (including 12, 14, of FIG. 1) of which edge 18 is representative are raised and may be generally planar such as rear edge 16 or may be an inverted V-shape such as front edge 18. The inverted V-shape provides additional support and strength. The edges prevent water that has collected from leaks from plumbing fixtures or other sources above the mat from spilling or flowing over the edges of the mat onto the subjacent cabinet or floor.

A plurality of parallel, spaced-apart ribs 60 extend forwardly along the top of bottom panel 25. The ribs increase in height from rear edge 16 to their forward, distal end at location 30. The plurality of ribs 60 define a plurality of water channels 65 between the ribs 60 which, due to the inclination of the bottom panel 25, will collect and direct water forwardly from the water channeling area 36. An alarm (not shown) may be disposed in the collection area 26, or in an optional concentrating collection area (not shown) which may, after filling overflow into the typically larger collection area 26. The transverse dam 66 extends across the forward ends of the water channels 65 and defines a transverse channel 68 which collects the water flowing forwardly. Water flows over the dam 66 when it reaches the height of the dam 66 and spills into the collection area 26 at the front of the mat 100. Since the collection area 26 is located at the front of the mat, a user can easily check for any water is in this area to determine if a leak has occurred.

Further the supporting ribs, or webs 40 on the undersurface of the mat, as well as the plurality of forwardly extending ribs 60 on the upper surface provide a very stable support which will allow the user to place items such as household items and heavy items such as reverse osmosis units on the planar surface defined by the upper edges of the ribs. In this way, the mat 100 can be installed and will collect water from leaks which will be collected on the mat and directed to the forward collection area 26. The mat does not interfere with the storage utilization of space within the cabinet.

FIGS. 4 to 9 show an alternate example of the present invention which the mat 100 includes an alarm unit. The design of the mat with sloping channels to a central collection point tends to increase the sensitivity of the alarm unit to small spills.

Figure 4:
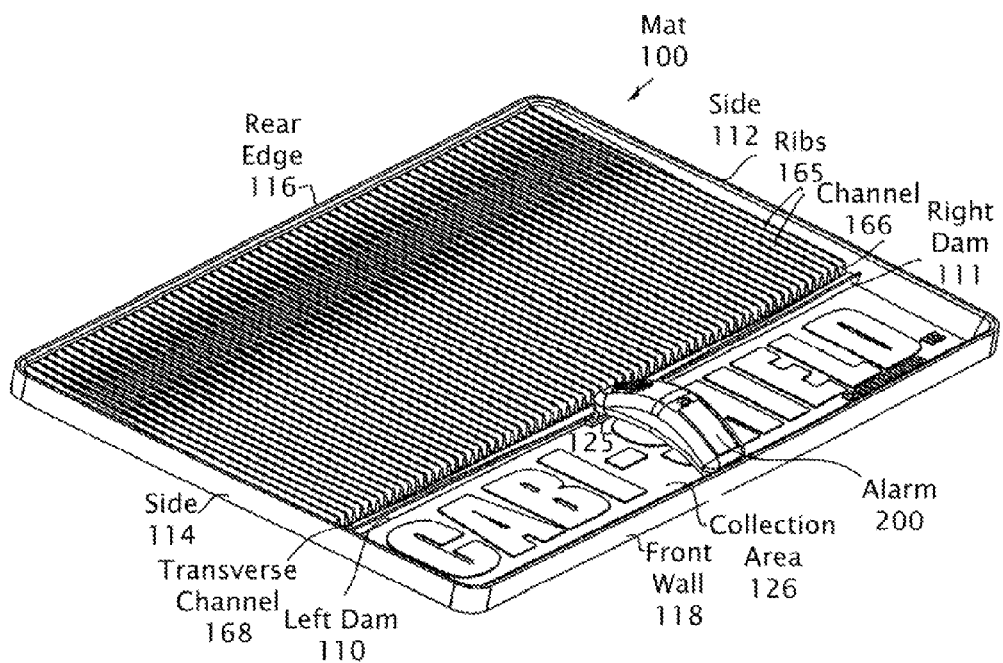
FIG. 4 is a top perspective view of an alternate example of the mat including an alarm.

FIG. 4 is a top perspective view of an alternate example of the mat 100 of the present invention including an alarm 200. Also included in this example is the collection reservoir 125, for increasing the sensitivity of the alarm 200. The mat 100 is generally constructed as described previously being integrally formed from a suitable material having front and rear edges 116, 118 and opposite sides 112, 114. The underside, again, has a supporting grid, as seen in FIG. 2, and the upper surface has a plurality of ribs 165 forming the sides of water channels 166 which direct collected water forwardly to the distal end of these ribs at the dams 110, 111. A water collection area 126 is defined forwardly of the distal ends of the ribs. The example 100 has provision for installation of an alarm 200.

A pair of dams 110 (right dam), 111 (left dam) extend from opposite side edges to a central reservoir 125. At the sides 114, 112 of the mat 100 the bottom of the channels 166, 168 are higher than where they enter the collection reservoir 125, so that liquid collected against the dams 110, 111 first enters collection reservoir 125 before overflowing into collection area 126. The alarm 200 is disposed so that it is in electrical contact with fluids collected in the collection reservoir 125. By providing an initial collection point 125, the sensitivity of the alarm 200 tends to be increased since a small spill will be sufficient to fill the smaller reservoir 125 to a level sufficient to trigger the alarm 200.

Figure 5:
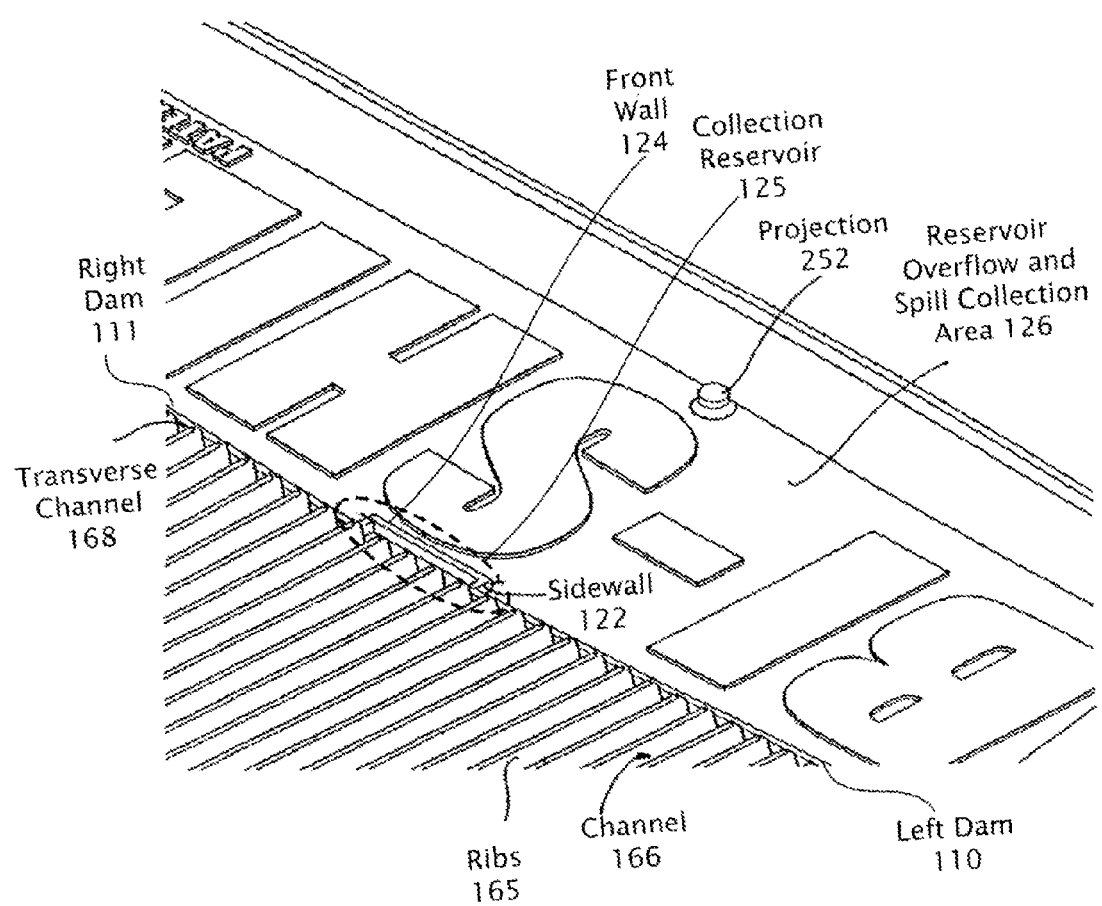
FIG. 5 is detail view of a section of the mat seen in FIG. 4.

FIG. 5 is detail view of a section of the mat seen in FIG. 4. The reservoir 125 is defined by opposite sidewalls 122 and a front wall 124 which may be extended from, and coupled to the dams 110, 111, typically molded as a single piece. The dams 110 and 111 have floors formed between the dam 110, 111 and the ends of the ribs 165, such that liquid flows down the channels 166 and is collected in the transverse channel 168 where it then flows into the collection reservoir 125. The transverse channel 168 directs water flowing from channels 165 into the reservoir 125. When the reservoir 125 is filled, the water will overflow from the reservoir and into the water collection area 126 at the front of the mat 100.

Example 100 is configured for attachment of an optional alarm device 200. Projection 252 may engage a matching recess in the alarm device (not shown) to hold it in place while being used.

Figure 6:
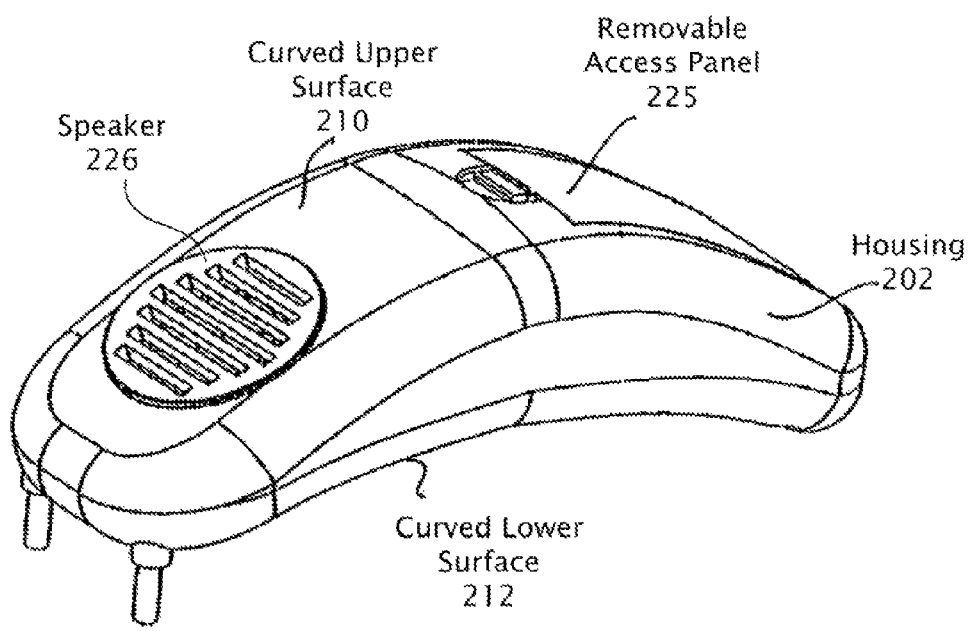
FIG. 6 is a top perspective view of the detachable alarm unit.

FIG. 6 is a top perspective view of the detachable alarm unit 200. The alarm 200 has a durable outer housing 202 of plastic or other suitable material. The housing may be variously shaped but preferably has a generally accurate or curved upper surface 210 and a curved lower surface 212. The alarm may include a removable access panel 225 so that batteries may be changed if needed. A speaker 226 is also shown.

Figure 7:
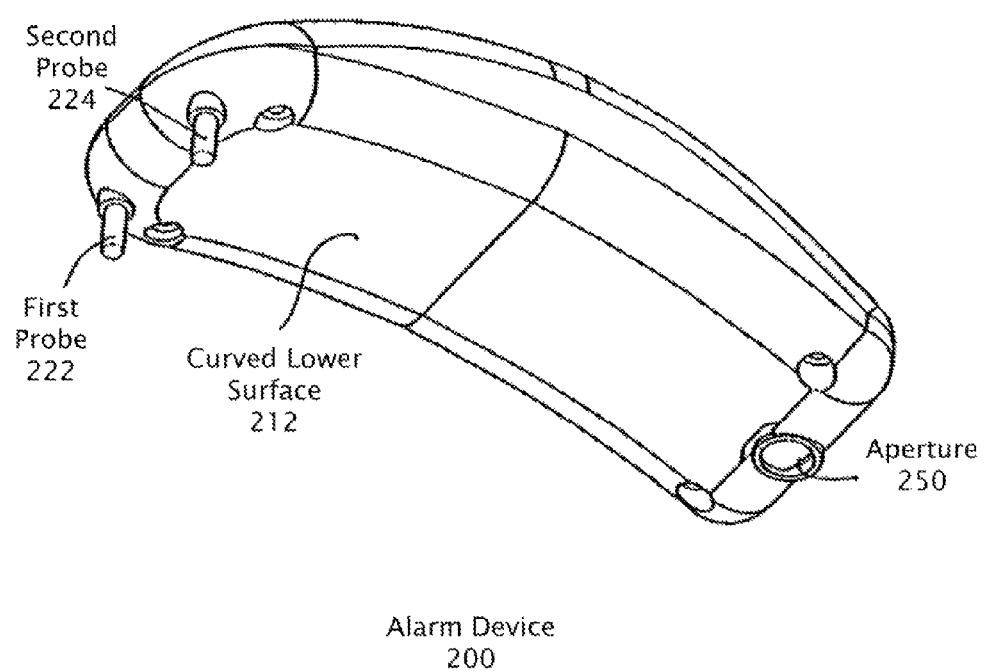
FIG. 7 is a bottom perspective view of the detachable alarm unit.

FIG. 7 is a bottom perspective view of the detachable alarm unit 200. The unit 200 includes a first and second probe 222, 224 for sensing the conductivity of a fluid. The unit has a curved lower surface 212, and an aperture 250 that couples to the previously described protrusion (252 of FIG. 5). The housing contains a power source such as a battery which may be accessed through a removable access panel 225 for installation and replacement.

Figure 8:
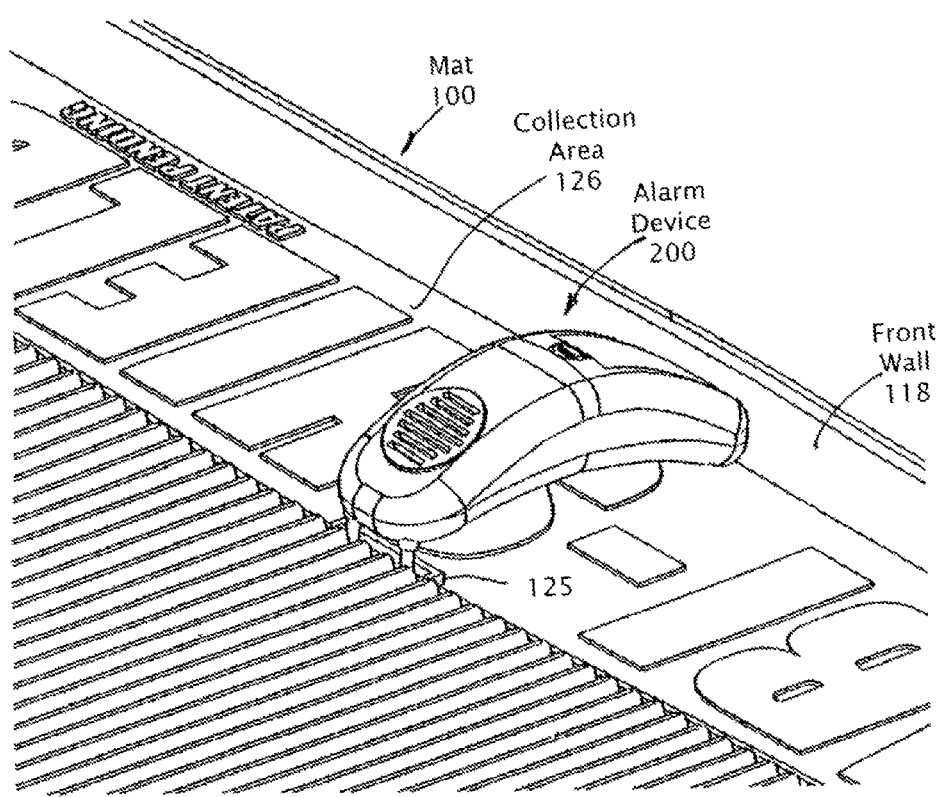
FIG. 8 is an enlarged detail view showing the alarm installed on the example of the mat seen in FIG. 4.

FIG. 8 is an enlarged detail view showing the alarm 200 installed on the mat 100. The length of the alarm housing may be selected so that the alarm 200 may be conveniently positioned extending from the front wall 118 of the mat, rearwardly to the small collection reservoir 125. The alarm is easily removable and replaceable for servicing or cleaning. The central location will normally position the alarm when the mat is installed behind the center post common to most sink and bath cabinets.

Figure 9:
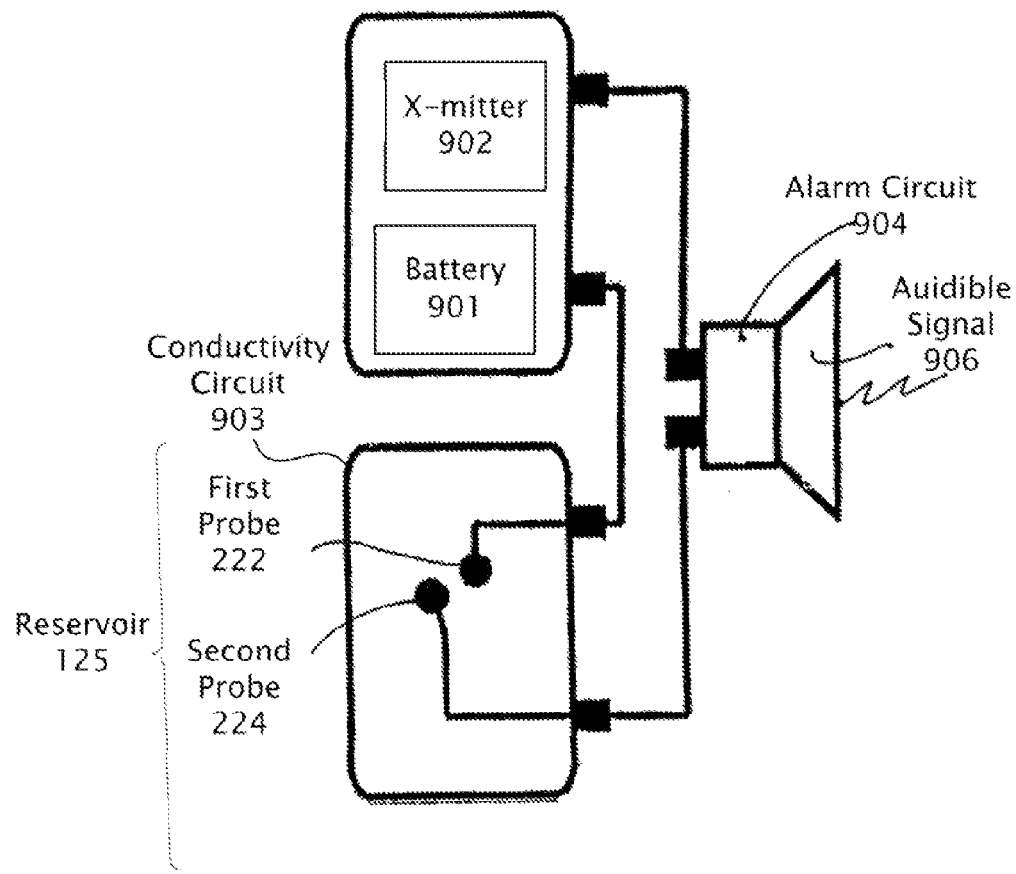
FIG. 9 is a diagrammatic view of the alert alarm circuitry.

FIG. 9 is a diagrammatic view of the alert alarm circuitry of the alarm (200 of FIG. 4) that includes a conventional transmitter module 902 for communicating an indication of a leak to a cell phone or other equivalent wireless device. The connection may be by a Bluetooth signal, a Wi-Fi connection or any suitable method desired. An application on a smart, or cell phone may interpret t rear14wardly eh signal and provide an indication to the user that a leak is present. Alternatively the signal may be provided to an alarm company or other service that remotely monitors the condition of homes and other such systems. Many times leaks go undetected because the user does not periodically check the location of the mat to see if water has collected. The remotely transmitted signal can be helpful in avoiding damage from a leak that continues without appropriate correction for a long period of time.

The battery 901 powers a conventionally constructed conductivity circuit, having two spaced-apart probes 222, 224 which extend from the bottom of the forward end of the alarm. The probes, when the device is installed, are inserted into the collection reservoir (125 of FIG. 4). When a leak occurs and water collects in the reservoir 125, a circuit is established between the probes due to the ionic conductivity of the water. This, in turn, will activate an alarm circuit 904 which may be a visual alarm such as a light accompanied by an audible alarm 906 which either periodically or continually emits beeps to call a potential water leak to the attention of the user.

It will be obvious to those skilled in the art to make various changes, alterations and modifications to the invention described herein. To the extent such changes, alterations and modifications do not depart from the spirit and scope of the appended claims, they are intended to be encompassed therein.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A protective mat for placement beneath a potential fluid leak source to collect leaks that may occur, said mat comprising:
- a panel having a top and bottom surface, said panel having upstanding front, rear and opposite side edges, said panel having a rear section extending forwardly on said top surface from said rear edge to a front fluid collection section which extends generally horizontally to said front edge;
- supporting webs extending from the bottom surface of said rear panel section;
- a plurality of ribs extending forwardly along the top surface of said rear panel section terminating at distal ends adjacent said front section, said ribs defining therebetween a plurality of forwardly extending and downwardly sloping fluid channels directing fluid to the front fluid collection section; and
- a pair of transverse dams disposed end to end and extending across the distal ends of said ribs to receive fluid from said channels and the pair of transverse dams having a bottom surface tilted inwardly and downwardly to a small central reservoir disposed to receive the fluid directed to the small central reservoir by the pair of transverse dams and to spill excess fluid from the small central reservoir into a collection area.

2. The protective mat of claim 1 wherein the rear panel section is forwardly declined and said ribs increase in height from the rear edge to their forward distal ends, the upper surface of the ribs defining a generally horizontal plane.

3. The protective mat of claim 1 wherein the webs form a grid.

4. The protective mat of claim 1 wherein the mat is molded and is generally rectangular elastomeric material.

5. The protective mat of claim 1 wherein a reservoir is formed in said collection area and further including a conductivity sensor having probes insertable in said reservoir.

6. The protective mat of claim 5 wherein the conductivity sensor includes an alarm circuit to emit an audible alarm when fluid is present in the reservoir.

7. The protective mat of claim 6 wherein the conductivity sensor has a housing removably securable to said mat.

8. The protective mat of claim 6 wherein said conductivity sensor includes a transmitter for transmitting a wireless alarm signal to a remote location through.

9. A protective mat for placement beneath a potential leak source comprising:
- a panel having a top surface and a sidewall;
- a fluid collection reservoir on said top surface;
- a fluid channel directing fluid collected on said top surface to said fluid collection reservoir, the fluid channel between a plurality of ribs which, due to an inclination of the panel, will collect and direct fluid forwardly;
- a pair of transverse dams extending from opposite side edges of the panel to a central small reservoir, the transverse dams extending across a forward ends of the plurality ribs, and defines a transverse channel sloping downward which collects the fluid flowing forwardly in the small reservoir and spilling into the collection reservoir at the front of the mat when the small reservoir is full; and
- a conductivity sensor associated with said reservoir having an alarm which is actuated when fluid is present in said reservoir causing an electrical circuit to be completed by the fluid contacting the pair of contacts and causing an ionic conductivity, said conductivity sensor positioned extending from a front wall of the mat rearwardly to the small reservoir, and a lower surface of the conductivity sensor housing defining an aperture which receives a projection located in the fluid collection reservoir to align and position the alarm.

10. The protective mat of claim 9 wherein said sensor is removably attached to said panel.

11. The protective mat of claim 9 wherein the fluid channel comprises a plurality of channels defined by a plurality of ribs.

12. The protective mat of claim 11 wherein the ribs have upper surfaces which define a planar support surface.

13. protective mat of claim 11 wherein the fluid collection reservoir is centrally located on said panel.

14. A protective mat for placement beneath a potential leak source comprising:
- a panel having a top surface and a sidewall;
- a fluid collection reservoir on said top surface;
- a fluid channel directing fluid collected on said top surface to said fluid collection reservoir, the fluid channel between a plurality of ribs which, due to an inclination of the panel, will collect and direct fluid forwardly;
- a pair of transverse dams extending from opposite side edges of the panel to a central small reservoir, the transverse dams extending across a forward ends of the plurality ribs, and defines a transverse channel sloping downward which collects the fluid flowing forwardly in the small reservoir and spilling into the collection reservoir at the front of the mat when the small reservoir is full:
- a conductivity sensor associated with said reservoir having an alarm which is actuated when fluid is present in said reservoir causing an electrical circuit to be completed by the fluid contacting the pair of contacts and causing an ionic conductivity, said conductivity sensor positioned extending from a front wall of the mat rearwardly to the small reservoir, and a lower surface of the conductivity sensor housing defining an aperture which receives a projection located in the fluid collection reservoir to align and position the alarm; and
- a wireless transmitter coupled to the conductivity sensor for communication of an alarm to a wireless device user.

* * * * *